United States Patent Office 2,823,158
Patented Feb. 11, 1958

2,823,158

N-CYANOETHYL CARBAZOLE FOR TREATING SYSTEMIC PLANT DISEASES

Chien-pen Lo, Philadelphia, Pa., assignor to Rohm & Haas Company, Philadelphia, Pa., a corporation of Delaware No Drawing. Application August 23, 1954
Serial No. 451,716

5 Claims. (Cl. 167—33)

This invention concerns a process for controlling or inhibiting plant diseases by applying to the plant environment N-cyanoethylcarbazole.

This compound has been prepared by reacting carbazole with acrylonitrile (cf. Whitmore et al., J. Amer. Chem. Soc. 66, 725). It has now been found that N-cyanoethylcarbazole is an effective plant chemoprophylactic and chemotherapeutant.

It may be applied to prevent damage from invasion of plants by pathogens or to mitigate or overcome the effects of the invasion of plants by pathogens. Application may be made by applying to the roots a suspension or dispersion of the above compound. Also, this compound may be applied to the leaves of the plant by spraying or dusting a composition containing it. Furthermore, in appropriate cases this compound may be applied by injection.

The chemoprophylactic and chemotherapeutic value of N-cyanoethylcarbazole was established through the Fusarium wilt assay method on tomatoes which has been described by Dimond et al. in Connecticut Agricultural Experiment Station Bulletin 557, April 1952. A range of concentrations from 31 p. p. m. to 250 p. p. m. of the compound was used. Suspensions were formed by dissolving the required weight of N-cyanoethylcarbazole in a small portion of acetone and diluting this with water. These suspensions were applied to the roots of tomato plants once each day for 10 days. The plants were then inoculated with *Fusarium oxysporum* f. *lycopersici* by immersing roots in a suspension of bud cells. Plants were then repotted in fresh sand. After an incubation period the plants were graded for severity of disease and rated by a disease index. This was 0.02 when N-cyanoethylcarbazole was used at $1.13 \times 10^{-3}$ moles/l.; 0.06 at 0.56 mole/l.; and 0.04 at 0.28 mole/l. The inoculated check plants had a vascular index of 0.88.

The chemoprophylactic chemotherapeutic activity of N-cyanoethylcarbazole was also determined from foliage sprays. Here the compound was taken up in a polyethylene glycol having a molecular weight of 1500 and this mixture was emulsified in water with 1.5% of an emulsifying agent made by reacting polyglycerol and oleic acid. At 1000 p. p. m. this compound was highly effective.

The compound was also applied to cucumber plants for the control of scab with fair success. Snapdragon plants were treated with a suspension as above and inoculated with rust. The results were positive in the control of this disease. Bacterial wilt of corn is controlled in the same way.

Application of a suspension of 62 p. p. m. of N-cyanoethylcarbazole to the soil about eggplant produced a definite lowering of the disease index for Verticillium wilt.

Preliminary data show a favorable response against bacterial bean blight. There may also be controlled big vein of lettuce.

The effectiveness of N-cyanomethylcarbazole is rather interesting when it is considered that carbazole is ineffective as a chemoprophylactic and chemotherapeutant and the N-substituted carbazoles are not toxic to Fusarium in tests in vitro. Tests have also been made with N-methylcarbazole. While it is quite active, the difference in the levels at which chemoprophylactic and chemotherapeutic action is obtained and phytotoxicity occurs are so close as to preclude practical application. On the other hand N-cyanoethylcarbazole controls disease without serious phytotoxic action over a very wide range of concentrations.

I claim:

1. A chemoprophylactic and chemotherapeutic process for immunizing plants against systemic diseases and for curing plants already subjected to such diseases, said process comprising administration of N-cyanoethylcarbazole systemically to a plant through application of the compound to at least one element of the immediate plant environment which is comprised of the plant's leaves, roots and the soil adjacent the plant' roots.

2. The process of claim 1 in which the form of compound administered systematically to the plant is selected from the group consisting of an aqueous dispersion of N-cyanoethylcarbazole, an aqueous suspension of N-cyanoethylcarbazole, and a dry dusting powder of N-cyanoethylcarbazole.

3. The process of claim 2 in which the compound administered systematically to the plant is an aqueous dispersion of N-cyanoethylcarbazole.

4. The process of claim 2 in which the compound administered systematically to the plant is an aqueous suspension of N-cyanoethylcarbazole.

5. The process of claim 2 in which the compound administered systematically to the plant is a dry dusting powder of N-cyanoethylcarbazole.

References Cited in the file of this patent

FOREIGN PATENTS 846,438     France _____ Sept. 18, 1939

OTHER REFERENCES

U. S. Dept. of Agri., Handbook No. 69, May 1954, p. 109.

Plant Disease Reporter, vol. 36, No. 2, pp. 35–43. (February 1952).

Frear: Catalogue of Insecticides and Fungicides, vol. 1, p. 157, 1947.

Whitmore: J. of the Am. Chem. Soc., vol. 66, 1944, pp. 725–731.

Begue: Chem. Abstr., vol. 42, 1948, p. 4708.